(12) United States Patent
Miller et al.

(10) Patent No.: US 11,702,985 B1
(45) Date of Patent: Jul. 18, 2023

(54) THERMAL MANAGEMENT SYSTEM (71) Applicant: General Electric Company, Schenectady, NY (US)

(72) Inventors: Brandon Wayne Miller, Liberty Township, OH (US); Daniel Alan Niergarth, Norwood, OH (US); Brian Gene Brzek, Clifton Park, NY (US); Kevin Edward Hinderliter, Cincinnati, OH (US); Brian Lewis Devendorf, Georgetown, MA (US); Nathan Evan McCurdy Gibson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/724,096

(22) Filed: Apr. 19, 2022

(51) Int. Cl.
*F02C 7/12* (2006.01)

(52) U.S. Cl.
CPC ............ *F02C 7/12* (2013.01); *F05D 2220/32* (2013.01); *F05D 2260/20* (2013.01)

(58) Field of Classification Search
CPC ...... F02C 7/12; F02C 3/04; F02C 7/06; F05D 2220/32; F05D 2260/20; F01D 11/24
See application file for complete search history.

(56) References Cited

U.S. PATENT DOCUMENTS

| | | |
|---|---|---|
| 4,505,124 A | 3/1985 | Mayer |
| 4,705,100 A | 11/1987 | Black et al. |
| 4,714,139 A | 12/1987 | Lorenz et al. |
| 4,776,536 A | 10/1988 | Hudson et al. |
| 6,182,435 B1 | 2/2001 | Niggemann et al. |
| 6,415,595 B1 | 7/2002 | Wilmot, Jr. et al. |
| 6,939,392 B2 | 9/2005 | Huang et al. |
| 7,055,505 B2 | 6/2006 | Washeleski et al. |
| 7,260,926 B2 | 8/2007 | Sabatino et al. |
| 7,459,081 B2 | 12/2008 | Koenig et al. |
| 7,694,916 B2 | 4/2010 | Limaye et al. |
| 7,984,606 B2 | 7/2011 | Smith |
| 8,042,343 B2 | 10/2011 | Jarlestal |
| 8,132,398 B2 | 3/2012 | Wang et al. |
| 8,499,822 B2 | 8/2013 | Bulin et al. |
| 8,522,572 B2 | 9/2013 | Coffinberry et al. |
| 8,677,755 B2 | 3/2014 | Bulin et al. |
| 9,038,397 B2 | 5/2015 | Papa et al. |
| 9,074,562 B2 | 7/2015 | Tsutsumi et al. |
| 9,151,180 B2 | 10/2015 | Veilleux, Jr. |
| 9,334,802 B2 | 5/2016 | Papa et al. |
| 9,561,857 B2 | 2/2017 | Weber |
| 9,604,730 B2 | 3/2017 | Hagh et al. |
| 9,687,773 B2 | 6/2017 | Johnson et al. |

(Continued)

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A thermal management system is provided for incorporation into a gas turbine engine, wherein the gas turbine engine, the aircraft, or both define a vertical direction. The thermal management system including: a thermal transport bus having a thermal fluid flowing therethrough; a plurality of heat source exchangers in thermal communication with the thermal fluid in the thermal transport bus; and a pump assembly in flow communication with the thermal transport bus, the pump assembly including: a pump; and a pump protection device positioned below the pump along the vertical direction.

20 Claims, 7 Drawing Sheets

(56) References Cited

U.S. PATENT DOCUMENTS

| | | | |
|---|---|---|---|
| 9,724,625 B2 * | 8/2017 | Lo | B64D 37/32 |
| 9,752,462 B1 * | 9/2017 | Fletcher | F02C 1/10 |
| 9,823,030 B2 | 11/2017 | Veilleux, Jr. | |
| 9,834,315 B2 | 12/2017 | Lo et al. | |
| 9,863,322 B2 | 1/2018 | Williams et al. | |
| 10,086,222 B2 | 10/2018 | Tichborne et al. | |
| 10,260,419 B2 * | 4/2019 | Cerny | F25B 1/00 |
| 10,352,241 B2 | 7/2019 | Snape et al. | |
| 10,364,750 B2 | 7/2019 | Rambo | |
| 10,526,971 B2 | 1/2020 | Mastrocola et al. | |
| 10,914,274 B1 | 2/2021 | O'Connor et al. | |
| 10,941,706 B2 | 3/2021 | Sen et al. | |
| 11,015,534 B2 | 5/2021 | Smith et al. | |
| 11,067,000 B2 * | 7/2021 | Smith | F02C 7/32 |
| 11,085,636 B2 | 8/2021 | O'Connor et al. | |
| 11,125,165 B2 | 9/2021 | Niergarth et al. | |
| 11,131,256 B2 | 9/2021 | O'Connor et al. | |
| 11,143,104 B2 | 10/2021 | Pal et al. | |
| 11,161,622 B2 | 11/2021 | Andrews, Jr. et al. | |
| 11,186,382 B2 | 11/2021 | Andrews, Jr. et al. | |
| 11,187,156 B2 | 11/2021 | Niergarth et al. | |
| 2007/0101731 A1 | 5/2007 | Bayt et al. | |
| 2011/0262309 A1 | 10/2011 | Limaye et al. | |
| 2012/0216677 A1 | 8/2012 | Koenig et al. | |
| 2012/0297780 A1 | 11/2012 | Bruno et al. | |
| 2017/0058774 A1 | 3/2017 | Pickford | |
| 2017/0167307 A1 | 6/2017 | Scipio et al. | |
| 2017/0167382 A1 * | 6/2017 | Miller | B64D 15/06 |
| 2017/0217592 A1 | 8/2017 | Hinderliter | |
| 2019/0218971 A1 | 7/2019 | Niergarth et al. | |
| 2019/0309997 A1 * | 10/2019 | Fletcher | F25B 9/004 |
| 2019/0383564 A1 | 12/2019 | Miller et al. | |
| 2020/0140109 A1 | 5/2020 | O'Connor et al. | |
| 2020/0140110 A1 | 5/2020 | O'Connor et al. | |
| 2020/0140113 A1 | 5/2020 | Niergarth et al. | |
| 2020/0141575 A1 | 5/2020 | O'Connor et al. | |
| 2020/0165974 A1 | 5/2020 | Smith et al. | |
| 2021/0148283 A1 | 5/2021 | Niergarth et al. | |
| 2021/0339878 A1 | 11/2021 | Niergarth et al. | |
| 2021/0340913 A1 | 11/2021 | Andrews, Jr. et al. | |
| 2021/0340936 A1 | 11/2021 | O'Connor et al. | |

\* cited by examiner

THERMAL MANAGEMENT SYSTEM

FIELD

The present disclosure relates to a thermal management system for a gas turbine engine and a method for operating the same.

BACKGROUND

Gas turbine engines typically include an inlet, a fan, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

During operation of the gas turbine engine, various systems may generate a relatively large amount of heat. Thermal management systems of the gas turbine engine may collect heat from one or more of these systems to maintain a temperature of such systems within an acceptable operating range. The thermal management systems may remove or expel such heat through one or more heat exchangers. In at least certain embodiments, at least one of the heat exchangers may be integrated into one or more components exposed to the bypass airflow passage, such as one or more struts extending between the turbomachine and the outer nacelle.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting. The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components or systems. For example, the approximating language may refer to being within a 1, 2, 4, 10, 15, or 20 percent margin. These approximating margins may apply to a single value, either or both endpoints defining numerical ranges, or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

However, the inventors of the present disclosure have found that further benefits may be achieved by providing certain spatial orientations of the thermal management system components. Accordingly, a thermal management system with improved spatial location of components would be useful.

A thermal management system for a gas turbine engine is provided. The thermal management system includes a thermal transport bus, a plurality of heat source exchangers, and a pump assembly. The thermal transport bus has a thermal fluid flowing therethrough. The plurality of heat source exchangers are in thermal communication with the thermal fluid. The pump assembly is in flow communication with the thermal transport bus. Moreover, the pump assembly further comprises a pump and a pump protection device. Additionally, the pump protection device is positioned below the pump along the vertical direction.

In another exemplary aspect of the present disclosure, a gas turbine engine is provided. The gas turbine engine includes a compressor section, a main lubrication system, a thermal transport bus, a plurality of heat source exchangers, and a pump assembly. The compressor section is rotatable with a turbine section of the gas turbine engine. The main lubrication system is configured to provide lubrication to the compressor section, the turbine section, or a combination thereof. The thermal transport bus is configured to have a thermal fluid flowing therethrough. The plurality of heat source exchangers are configured to be in thermal communication with the thermal fluid. The pump assembly is configured to be in flow communication with the thermal transport bus. The pump assembly includes a pump and a pump protection device. The pump protection device is configured to be positioned below the pump along the vertical direction, relative to ground.

For example, the thermal management system for a gas turbine engine of the present disclosure may tailor the spatial location and relative heights of component to provide increased operability of the thermal management system. The thermal management system of the present disclosure may augment previously employed thermal management systems. As described below in more detail, the inventive thermal management system may include a pump assembly. The pump assembly further including a pump positioned substantially at the top of the gas turbine engine, elevated above the lowest component of the thermal transport bus. Thus, the thermal management system may rely on natural convection and the relative height of components of the thermal transport bus to improve the operability of the thermal management system. In essence, the pump assembly may be configured to prevent liquid ingestion of the thermal fluid into the pump. Additionally, the thermal management system can accommodate banking and aircraft maneuvering during operation.

As will be discussed in more detail below, thermal transport buses are high power density means of moving heat around the gas turbine engine that are thermodynamically advantageous and help to improve thermal management. Thermal management systems may advantageously be utilized as a means of moving heat around because thermal management systems may be considered more reliable a highly efficient when compared to at least certain existing systems. To improve system operability and efficiency the thermal management system may use a supercritical thermal fluid. Supercritical fluids combine the properties of gases and liquids and provide desired thermodynamic properties.

Aspects of the present disclosure further present a method of operating a thermal management system of a gas turbine engine during a start-up the gas turbine engine. For example, a pump of a pump assembly is configured to start in response to receiving data indicative of a state of a thermal fluid within a thermal transport bus of the thermal management system, such as data indicative of at least a certain amount of the thermal fluid being in a supercritical phase. Benefits of the disclosed method include improved operability of the thermal management system, improved reliability during operation of the thermal management system, and improved durability of the thermal management system.

Figure 1:
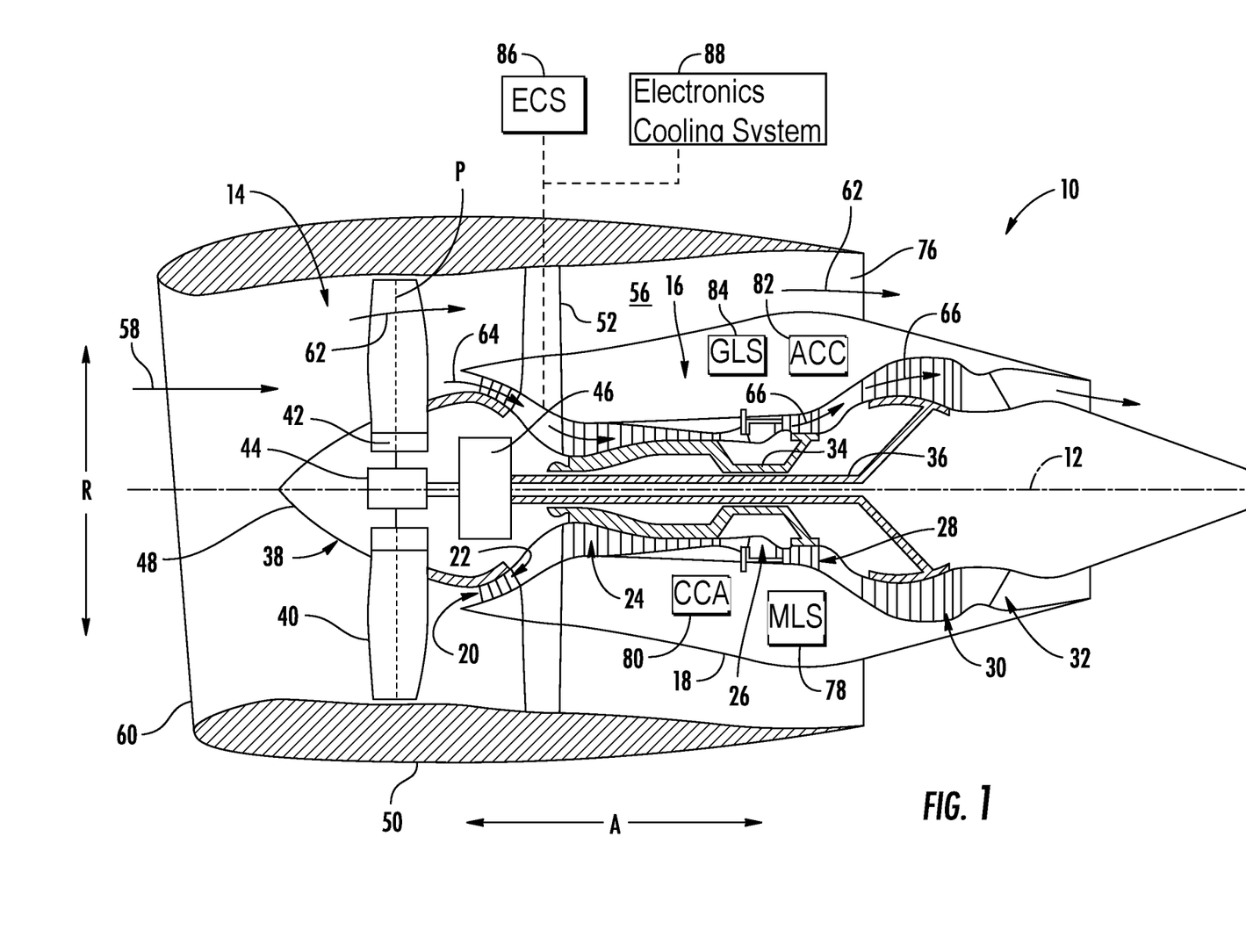
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by nacelle 48 aerodynamically contoured to promote an airflow through the plurality of fan blades 40. Additionally, the exemplary fan section 14 includes an annular fan casing or outer nacelle 50 that circumferentially surrounds the fan 38 or at least a portion of the turbomachine 16. The nacelle 48 is supported relative to the turbomachine 16 by a plurality of circumferentially-spaced outlet guide vanes 52. Moreover, the nacelle 48 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 48 or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Moreover, as is depicted schematically, the exemplary turbofan engine 10 further includes various accessory systems to aid in the operation of the turbofan engine 10 or an aircraft including the turbofan engine 10. For example, the exemplary turbofan engine 10 further includes a main lubrication system 78 configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system 78 may increase the useful life of such components and may remove a certain amount of heat from such components. Additionally, the turbofan engine 10 includes a compressor cooling air (CCA) system 80 for providing air from one or both of the HP compressor 24 or LP compressor 22 to one or both of the HP turbine 28 or LP turbine 30. Moreover, the exemplary turbofan engine 10 includes an active thermal clearance control (ACC) system 82 for cooling a casing of the turbine section to maintain a clearance between the various turbine rotor blades 40 and the turbine casing within a desired range throughout various engine operating conditions. Furthermore, the exemplary turbofan engine 10 includes a generator lubrication system 84 for providing lubrication to an electronic generator, as well as cooling/heat removal for the electronic generator. The electronic generator may provide electrical power to, e.g., a startup electric motor for the turbofan engine 10 or various other electronic components of the turbofan engine 10 or an aircraft including the turbofan engine 10.

As is also depicted schematically, the exemplary turbofan engine 10 drives or enables various other accessory systems, e.g., for an aircraft including the exemplary turbofan engine 10. For example, the exemplary turbofan engine 10 provides compressed air from the compressor section to an environmental control system (ECS) 86. The ECS 86 may provide an air supply to a cabin of the aircraft for pressurization and thermal control. Additionally, air may be provided from the exemplary turbofan engine 10 to an electronics cooling system 88 for maintaining a temperature of certain electronic components of the turbofan engine 10 or aircraft within a desired range.

Conventional turbofan engines 10 or aircrafts included individual heat exchangers for each of these accessory systems to remove heat from air or lubrication in such systems. However, aspects of the present disclosure include a thermal management system 100 (see FIG. 2) for transferring heat from some or all of such accessory systems to more efficiently remove such heat or utilize such heat.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
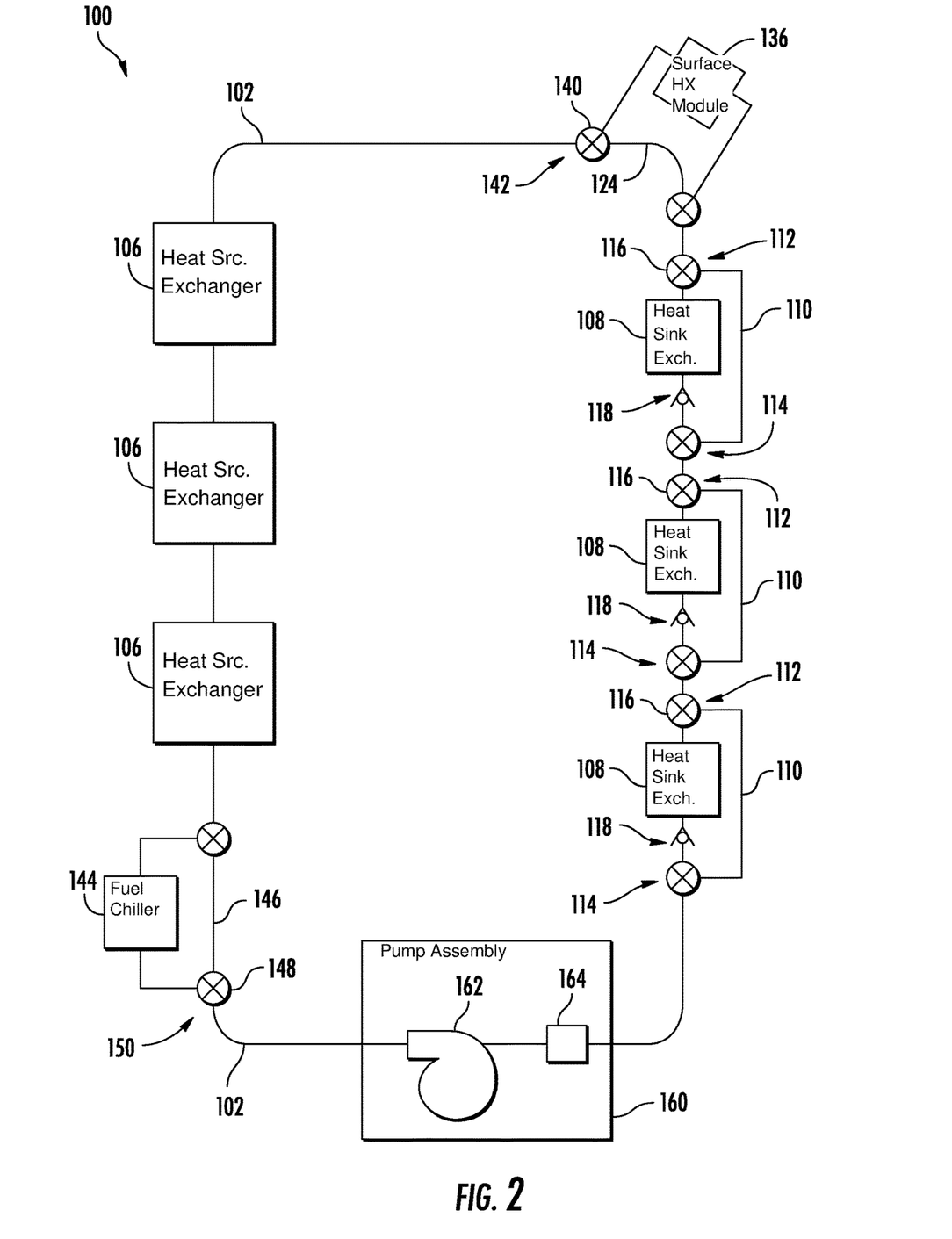
FIG. 2 is a simplified schematic view of a thermal management system in accordance with an exemplary embodiment of the present disclosure.
Figure 3:
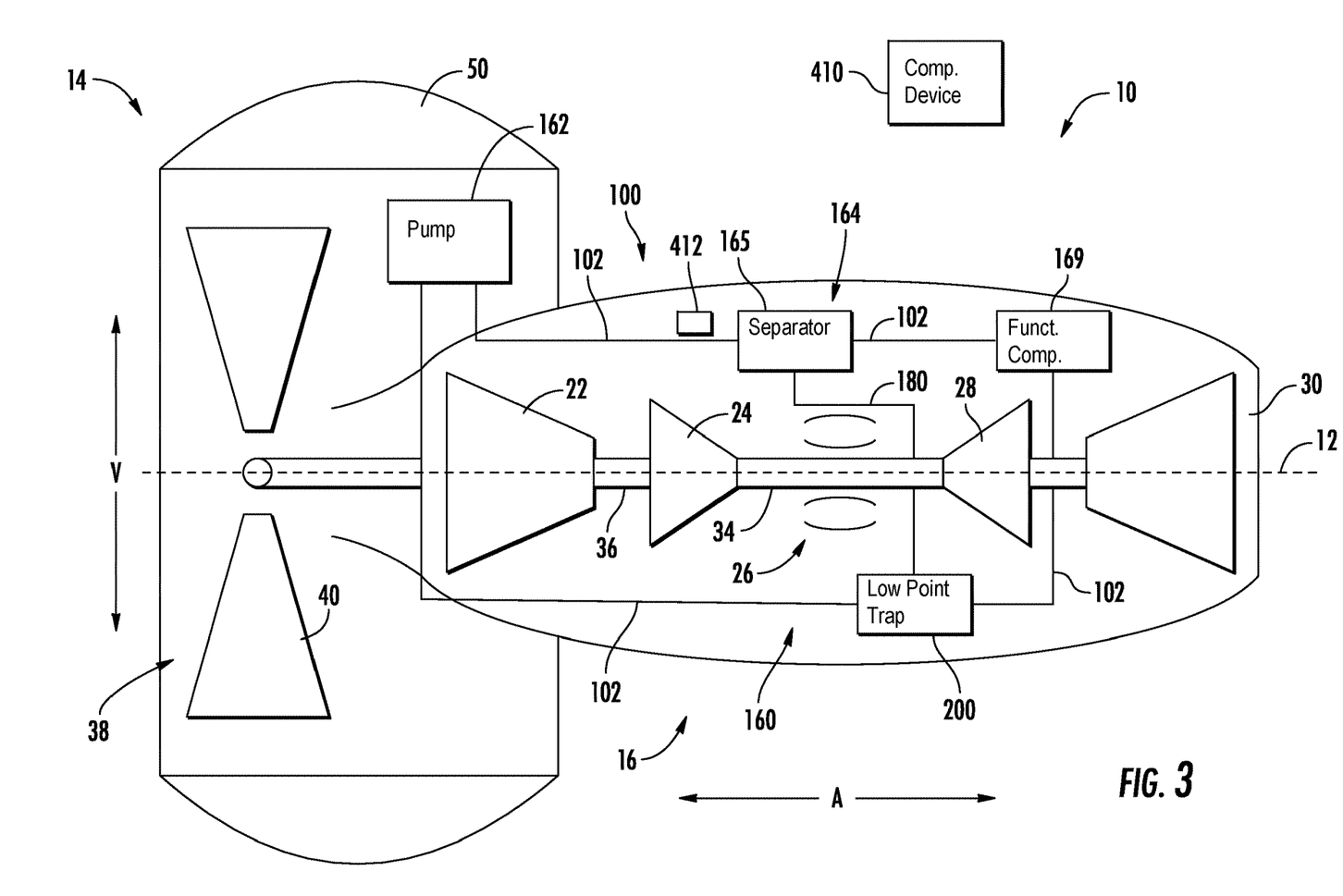
FIG. 3 is a simplified schematic view of a thermal management system in accordance with another exemplary embodiment of the present disclosure.

Referring now to FIG. 2, a schematic, flow diagram is provided of a thermal management system 100 in accordance with an exemplary embodiment of the present disclosure for incorporation at least partially into the exemplary turbofan engine 10 of FIGS. 1 and 3.

As shown, the thermal management system 100 generally includes a thermal transport bus 102. The thermal transport bus 102 includes an intermediary thermal fluid 103 (depicted in FIG. 4) flowing therethrough and may be formed of one or more suitable fluid conduits. The thermal fluid 103 may be a supercritical fluid having a temperature and pressure above its critical point. For example, in certain embodiments, thermal fluid 103 may be a supercritical carbon diode ("CO2"), or any suitable supercritical fluid. A pump assembly 160 is provided in flow communication with the thermal fluid 103 in the thermal transport bus 102. The pump assembly 160 generally includes a pump 162 and a pump protection device 164. The pump 162 is provided in flow communication with the thermal fluid 103 in the thermal transport bus 102 for generating a flow of the thermal fluid 103 in or through the thermal transport bus 102. As viewed in FIG. 2, the pump 162 may generate a flow of the thermal fluid 103 generally in a clockwise direction through the thermal transport bus 102. The pump 162 may be a rotary pump including an impeller, or alternatively may be any other suitable fluid pump. Additionally, the pump 162 may be powered by an electric motor, or alternatively may be in mechanical communication with and powered by, e.g., the HP shaft 34 or the LP shaft 36 of the turbofan engine 10. In still other embodiments, the pump 162 may be powered by an auxiliary turbine, which in turn may be powered by bleed air from compressor section of a gas turbine engine within which the system 100 is incorporated.

Additionally, the pump protection device 164 is provided in flow communication with the thermal fluid 103 in the thermal transport bus 102 for reducing an amount of out nonsupercritical or nongaseous material provided through the thermal transport bus 102 and to the pump 162. As viewed in FIG. 2, the pump protection device 164 is upstream of the pump 162. The pump protection device 164 may be a filter, a centrifuge, a trap, or alternatively may be any other suitable pump protection device 164.

Moreover, the exemplary thermal management system 100 includes one or more heat source exchangers 106 in thermal communication with the thermal fluid 103 in the thermal transport bus 102. Specifically, the thermal management system 100 depicted includes a plurality of heat source exchangers 106. The plurality of heat source exchangers 106 are configured to transfer heat from one or more of the accessory systems of the turbofan engine 10 (or in operable communication with the turbofan engine 10) to the thermal fluid 103 in the thermal transport bus 102. For example, in certain exemplary embodiments, the plurality of heat source exchangers 106 may include one or more of: a main lubrication system 78 heat exchanger for transferring heat from the main lubrication system 78; a CCA system heat source exchanger for transferring heat from the CCA system 80; an ACC system heat source exchanger for transferring heat from the ACC system 82; a generator lubrication system heat source exchanger for transferring heat from the generator lubrication system 84; an ECS heat exchanger for transferring heat from the ECS 86; an electronics cooling system heat exchanger for transferring heat from the electronics cooling system 88; a vapor compression system heat exchanger; an air cycle system heat exchanger; and an auxiliary system(s) heat source exchanger. By way of example, the auxiliary system(s) heat source exchanger may be configured to transfer heat from one or more of a radar system, a defense system, passenger entertainment systems, etc. Accordingly, a thermal management system 100 in accordance with an exemplary embodiment of FIG. 2 may transfer heat from a variety of independent systems to the thermal fluid 103 in the thermal transport bus 102 for removal.

For the embodiment depicted, there are three heat source exchangers 106, the three heat source exchangers 106 each arranged in series flow along the thermal transport bus 102. However, in other exemplary embodiments, any other suitable number of heat source exchangers 106 may be included and one or more of the heat source exchangers 106 may be arranged in parallel flow along the thermal transport bus 102. For example, in other embodiments, there may be a single heat source exchanger 106 in thermal communication with the thermal fluid 103 in the thermal transport bus 102, or alternatively, there may be at least two heat source exchangers 106, least four heat source exchangers 106, at least five heat source exchangers 106, or at least six heat source exchangers 106 in thermal communication with thermal fluid 103 in the thermal transport bus 102.

Additionally, the exemplary thermal management system 100 of FIG. 2 further includes one or more heat sink exchanger 108 permanently or selectively in thermal communication with the thermal fluid 103 in the thermal transport bus 102. The one or more heat sink exchangers 108 are located downstream of the plurality of heat source exchangers 106 and are configured for transferring heat from the thermal fluid 103 in the thermal transport bus 102, e.g., to atmosphere, to fuel, to a fan stream, etc. For example, in certain embodiments the one or more heat sink exchangers 108 may include at least one of a RAM heat exchanger, a fuel heat exchanger, a fan stream heat exchanger, a bleed air heat exchanger, an engine intercooler, or a cold air output of am air cycle system. The RAM heat exchanger may be configured as an "air to thermal fluid" heat exchanger integrated into one or both of the turbofan engine 10 or an aircraft including the turbofan engine 10. During operation, the RAM heat exchanger may remove heat from any thermal fluid 103 therein by flowing a certain amount of RAM air over the RAM heat exchanger. Additionally, the fuel heat exchanger is a "fluid to thermal fluid" heat exchanger wherein heat from the thermal fluid 103 is transferred to a stream of liquid fuel for the turbofan engine 10. Moreover, the fan stream heat exchanger is generally an "air to thermal fluid" heat exchanger which flows, e.g., bypass air over thermal fluid 103 to remove heat from the thermal fluid 103. Further, the bleed air heat exchanger is generally an "air to thermal fluid" heat exchanger which flows, e.g., bleed air from the LP compressor 22 over thermal fluid 103 to remove heat from the thermal fluid 103.

For the embodiment of FIG. 2, the one or more heat sink exchangers 108 of the thermal management system 100 depicted includes a plurality of individual heat sink exchangers 108. More particularly, for the embodiment of FIG. 2, the one or more heat sink exchangers 108 include three heat sink exchangers 108 arranged in series. The three heat sink exchangers 108 are configured as a RAM heat exchanger, a fuel heat exchanger, and a fan stream heat exchanger. However, in other exemplary embodiments, the one or more heat sink exchangers 108 may include any other suitable number of heat sink exchangers 108. For example, in other exemplary embodiments, a single heat sink exchanger 108 may be provided, at least two heat sink exchangers 108 may be provided, at least four heat sink exchangers 108 may be provided, or at least five heat sink exchangers 108 may be provided. Additionally, in still other exemplary embodiments, two or more of the one or more heat sink exchangers 108 may alternatively be arranged in parallel flow with one another.

Referring still to the exemplary embodiment depicted in FIG. 2, the plurality of heat sink exchangers 108 are selectively in thermal communication with the thermal fluid 103 in the thermal transport bus 102. More particularly, the thermal management system 100 depicted includes a plurality of bypass lines 110 for selectively bypassing each heat sink exchanger 108 in the plurality of heat sink exchangers 108. Each bypass line 110 extends between an upstream juncture 112 and a downstream juncture 114—the upstream juncture 112 located just upstream of a respective heat sink exchanger 108, and the downstream juncture 114 located just downstream of the respective heat sink exchanger 108. Additionally, each bypass line 110 meets at the respective upstream juncture 112 with the thermal transport bus 102 via a three-way heat sink valve 116. The three-way heat sink valves 116 each include an inlet fluidly connected with the thermal transport bus 102, a first outlet fluidly connected with the thermal transport bus 102, and a second outlet fluidly connected with the bypass line 110. The three-way heat sink valves 116 may each be a variable throughput three-way valve, such that the three-way heat sink valves 116 may vary a throughput from the inlet to the first or second outlets. For example, the three-way heat sink valves 116 may be configured for providing anywhere between zero percent (0%) and one hundred percent (100%) of the thermal fluid 103 from the inlet to the first outlet, and similarly, the three-way heat sink valves 116 may be configured for providing anywhere between zero percent (0%) and one hundred percent (100%) of the thermal fluid 103 from the inlet to the second outlet.

Notably, the three-way heat sink valves 116 may be in operable communication with a controller of the turbofan engine 10 or of an aircraft including the turbofan engine 10. The controller may bypass one or more of the one or more heat sink exchangers 108 based on, e.g., an operating condition of the turbofan engine 10 or aircraft, a temperature of the thermal fluid 103, or any other suitable variables. Alternatively, the controller may bypass one or more of the one or more heat sink exchangers 108 based on a user input.

Further, each bypass line 110 also meets at the respective downstream juncture 114 with the thermal transport bus 102. Between each heat sink exchanger 108 and downstream juncture 114, the thermal transport bus 102 includes a check valve 118 for ensuring a proper flow direction of the thermal fluid 103. More particularly, the check valve 118 prevents a flow of thermal fluid 103 from the downstream juncture 114 towards the respective heat sink exchanger 108.

The thermal management system 100 of FIG. 2 may more efficiently remove heat from the various accessory systems of the turbofan engine 10 or the aircraft, compared with conventional systems. For example, the various accessory systems may generate a varying amount of heat dependent on various operating conditions of the turbofan engine 10 or the aircraft. However, not all of the accessory systems define the same heat pattern (i.e., not all of the accessory systems heat up and cool down at the same time). For example, the main lubrication system 78 may require a maximum amount of heat removal during high load conditions of the turbofan engine 10. By contrast, however, the ECS 86 may require a max amount of heat removal during high-altitude flight. Accordingly, by integrating the heat removal for the variety of different accessory systems, fewer heat exchangers may be required to remove a desired amount of heat or smaller heat exchangers may be required to remove a desired amount of heat.

Moreover, due to the configuration of the various heat sink exchangers 108 (or a surface heat exchange module 136, discussed below) being in selective thermal communication with the thermal fluid 103 in the thermal transport bus 102, heat may be removed from the various accessory systems in a more efficient manner. For example, when a relatively low amount of heat is required to be removed from the thermal fluid 103, the most efficient heat sink exchanger 108 (or the surface heat exchange module 136, discussed below) may be utilized and the others bypassed. However, when a relatively high amount of heat is required to be removed from the thermal fluid 103, the additional heat sink exchangers 108 (or the surface heat exchange module 136, discussed below) may also be utilized.

Furthermore, in the exemplary embodiments including a plurality of heat sink exchangers 108 (or the surface heat exchange module 136, discussed below) having bypass capability, for example, the additional heat sink exchangers 108 (or the surface heat exchange module 136, discussed below) have the benefit of adding redundancy to the thermal management system 100. For example, in the event of a failure of one or more of the heat sink exchangers 108 or associated portions of the thermal transport bus 102, the thermal fluid 103 may be routed around such failure and the system 100 may continue to provide at least some heat removal.

Referring still to FIG. 2, the exemplary thermal management system 100 depicted is configured to use a supercritical thermal transport fluid. It should be appreciated, however, that in other embodiments, the thermal management system 100 instead use a phase change fluid. With such an embodiment, the thermal management system 100 may include a compressor for compressing the thermal fluid 103 in the thermal transport bus 102, and an expansion device for expanding the thermal fluid 103 in the thermal transport bus 102. The compressor may be selectively in fluid communication with the thermal fluid 103 at a location downstream of the heat source exchangers 106 and upstream of the one or more heat sink exchangers 108. By contrast, the expansion device may be selectively in fluid communication with the thermal fluid 103 at a location downstream of the one or more heat sink exchangers 108 and upstream of the heat source exchangers 106. In such an exemplary embodiment, the compressor may be driven by, e.g., an electric motor, or alternatively may be in mechanical communication with and driven by a rotary component of the turbofan engine 10, such as the HP shaft 34 or the LP shaft 36. Notably, with such a configuration, the one or more heat sink exchangers 108 (or the surface heat exchange module 136, discussed below) would act as a condenser, and the plurality of heat source exchangers 106 would act as an evaporator. Such a configuration may allow for efficient heat removal from the various heat source exchangers 106, and heat transfer to the one or more heat sink exchangers 108 (or the surface heat exchange module 136). It should also be appreciated, that in certain exemplary embodiments, the expansion device may be utilized as a power generating device configured to generate rotational power from a flow of thermal fluid 103 therethrough.

Further, the exemplary thermal management system 100 of FIG. 2 additionally includes a fuel chiller 144 selectively in thermal communication with thermal fluid 103 in the thermal transport bus 102 at a location upstream of the plurality of heat source exchangers 106 and downstream of the one or more heat sink exchangers 108. The fuel chiller 144 may be configured to remove heat from the fuel of the turbofan engine 10 to assist with maintaining the fuel within a desired temperature range. As with various other components of the thermal management system 100 of FIG. 2, the thermal management system 100 additionally includes a fuel chiller bypass line 146 for selectively bypassing the fuel chiller 144 and a three-way fuel chiller bypass valve 148. The three-way fuel chiller bypass valve 148 is located at an upstream juncture 150 and fluidly connects the thermal transport bus 102 and fuel chiller bypass line 146. The fuel chiller bypass valve 148 may be a variable throughput three-way valve configured in substantially the same manner as the exemplary three-way heat sink valves 116 described above for bypassing operation of a respective heat sink exchanger 108.

Furthermore, the exemplary thermal management system 100 of FIG. 2 includes features for heating or de-icing certain components of an aircraft or the turbofan engine 10. Specifically, the exemplary thermal management system 100 includes a surface heat exchange 136 in thermal communication with the thermal fluid 103 in the thermal transport bus 102 at a location downstream from the one or more heat source exchangers 106 for transferring heat from the thermal transfer fluid to a surface of one or more components of the turbofan engine 10 or an aircraft. For the embodiment depicted, the surface heat exchange module 136 is also located upstream of the one or more heat sink exchangers 108. However, in other embodiments, the surface heat exchange module 136 may instead be located at any suitable location downstream of the one or more heat source exchangers 106. For example, in other embodiments, the surface heat exchange module 136 may be located upstream of the pump 162, or alternatively may be located downstream of one or more of the heat sink exchangers 108

It should be appreciated, however, that the thermal management system 100 is provided by way of example only and that in other exemplary embodiments the thermal management system 100 may be configured in any other suitable manner. For example, in other exemplary embodiments, the thermal management system 100 may not include certain other components depicted in FIG. 2, such as the fuel chiller 144. Further, in still other embodiments, the thermal management system 100 may be configured as a dedicated surface heat exchange thermal management system 100. Accordingly, in such a configuration, the thermal management system 100 may not include one or more heat sink exchangers 108 in thermal communication with the thermal fluid 103 in the thermal transport bus 102, and instead, the surface heat exchange module 136 may be configured as the primary means for removing heat from the thermal fluid 103 in the thermal transport bus 102.

Referring now to FIG. 3, a gas turbine engine and thermal management system 100 in accordance with an exemplary embodiment of the present disclosure is provided. The exemplary gas turbine engine of FIG. 3 may be configured in a similar manner as the exemplary gas turbine engine described above with reference to FIG. 1 (turbofan engine 10), and similarly the thermal management system 100 of FIG. 3 may be configured in a similar manner as the exemplary thermal management system 100 of FIG. 2.

For example, the exemplary gas turbine engine of FIG. 3 is similarly configured as a turbofan engine 10, and generally defines an axial direction A (extending parallel to a longitudinal centerline 12 provided for reference), a radial direction R (not shown), a vertical direction V, and a circumferential direction (not shown).

Additionally, the exemplary turbofan engine 10 generally includes a fan section 14 and a turbomachine 16 disposed downstream from the fan section 14. The exemplary turbomachine 16 depicted generally includes a substantially tubular outer casing 18 that defines an annular inlet 20. The outer casing 18 encases, in serial flow relationship, a compressor section; a combustion section 26; a turbine section; and a jet exhaust nozzle section. The turbomachine 16 further includes a pair of shafts drivingly connects the compressor section to the turbine section.

Further, for the embodiment depicted, the fan section 14 includes a fan 38 having a plurality of blades 40 coupled to a rotor disk in a spaced apart manner. The rotor disk is covered by rotatable front hub aerodynamically contoured to promote an airflow through the plurality of fan blades. Additionally, the exemplary fan section 14 includes an annular fan casing or outer nacelle 50 that circumferentially surrounds the fan or at least a portion of the turbomachine 16. The outer nacelle 50 may generally include a nose cowl positioned at a forward end of the nacelle 48 to define an inlet to the turbofan engine and a fan cowl positioned aft of the nose cowl and extending around/enclosing the fan.

Referring still to FIG. 3, the exemplary thermal management system 100 generally includes a pump assembly 160. The pump assembly 160 may be incorporated into a thermal management system 100 similar to the exemplary thermal management system 100 of FIG. 2, or may be incorporated into any other suitable thermal management system 100.

As will be appreciated, the exemplary pump assembly 160 generally includes a pump 162, a pump protection device 164, and a portion of the thermal transport bus 102. Notably, the thermal transport bus functional components 169 may include one or more of the exemplary heat sink heat exchangers, heat source heat exchangers, surface heat exchange module 136, and fuel chiller as shown in FIG. 2. Although they are isolated to one box schematically in FIG. 3, it will be appreciated that one or more of the thermal transport bus functional components 169 may be arranged elsewhere, such as between one or more components of the pump assembly 160 depicted in FIG. 3 and described herein As briefly mentioned above, the thermal management system 100 may be configured as a supercritical thermal management system 100 configured to flow a supercritical fluid therethrough during normal operations. Normal operations refer to the gas turbine engine operating above an idle state. The pump 162 may be any suitable type of pump 162 to facilitate a pressure rise to allow a flow of the supercritical fluid during operations of the thermal management system 100. For example, the pump 162 may be a rotary pump having a rotating impeller to facilitate a desire pressure rise across an inlet and outlet of the pump 162.

As will be appreciated from the discussion herein, when a phase of the thermal fluid through the pump 162 is not 100% in the supercritical state, and a portion is instead, e.g., in a liquid state, such may cause damage, inefficiencies, or both to the pump 162. Accordingly, the pump assembly 160 of the present disclosure is designed to reduce a likelihood of damage, inefficiency, or both with such a configuration.

In particular, for the exemplary embodiment of FIG. 3, the exemplary pump 162 is the highest component in the vertical direction of the pump assembly 160, e.g., the pump 162 is elevated above other components of the pump assembly 160 along the vertical direction during a normal engine attitude. Engine attitude refers to the orientation of the gas turbine engine with respect to Earth's horizon. More particular, normal engine attitude refers to when the axial direction of the turbofan engine is parallel to the Earth's horizon.

The pump assembly 160 may thus then be configured to use natural convection along with relative height of the components to allow the pump 162 to generate a flow of the thermal fluid 103 (see FIG. 4) in the thermal transport bus 102 with a reduced risk of the thermal transport fluid being in multiple phases. More particularly, the exemplary pump assembly 160 may be in flow communication with a thermal fluid 103 in a thermal transport bus 102 at a location upstream of the plurality of heat source exchangers 106 of the thermal management system 100.

In addition, other aspects of the pump assembly 160 may further assist with reducing a risk of the thermal fluid 103 being in multiple phases at the pump 162. In particular, the pump assembly 160 further includes the pump protection device 164. The pump protection device 164 may generally include a separator 165, a low point trap 200, and a drain line 180 fluidly connecting the pump protection device 164 and the low point trap 200.

During operation, the separator 165 of the pump protection device 164 may filter out nongaseous or non-supercritical portions of the thermal fluid 103 e.g., filter the thermal fluid 103 to separate liquid $CO_2$ from the supercritical $CO_2$. The separator 165 may be any suitable separator device, such as a centrifuge.

Figure 4:
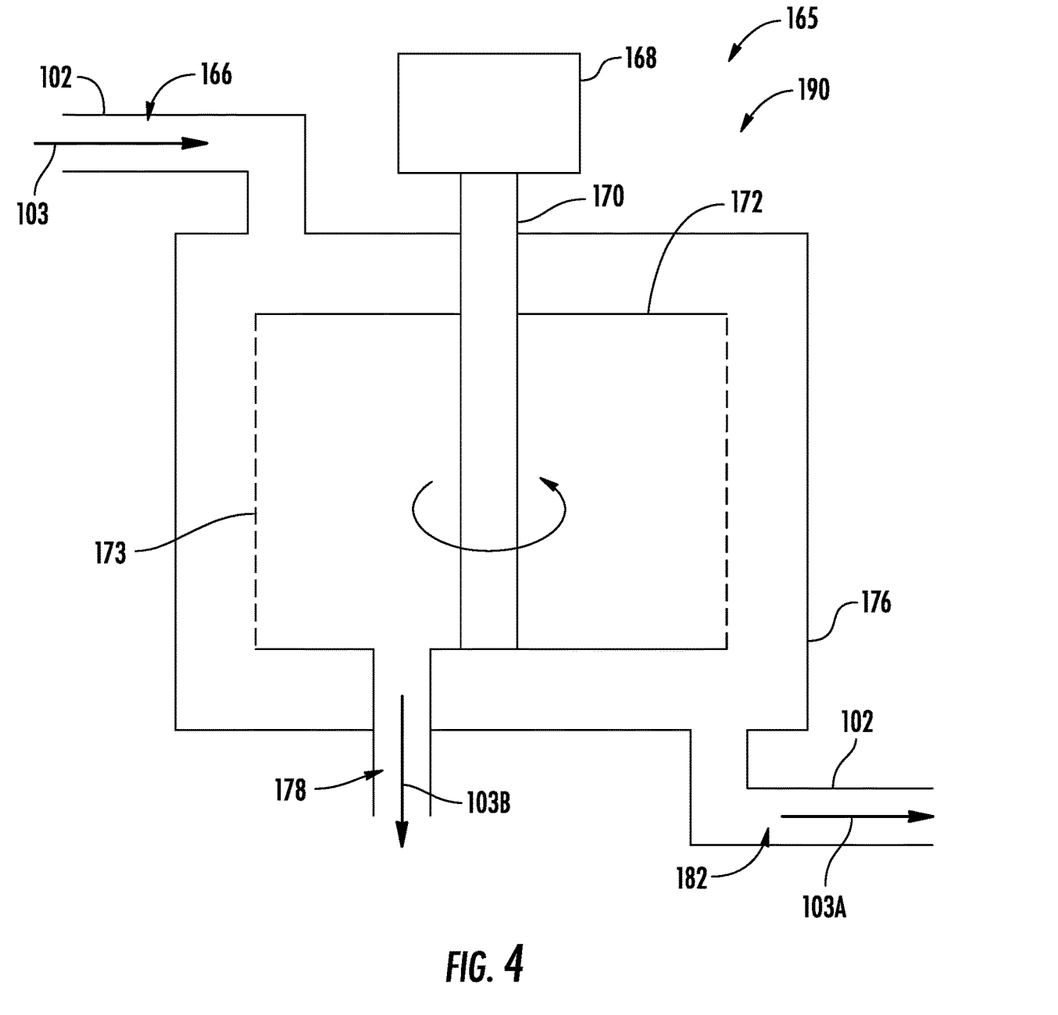
FIG. 4 is a pump protection device of a thermal management system in accordance with another exemplary embodiment of the present disclosure.

For example, referring now briefly to FIG. 4, a separator 165 of a pump protection device 164 of a thermal management system 100 in accordance with an exemplary embodiment of the present disclosure is provided. More specifically, the separator 165 of the exemplary embodiment depicted is a centrifuge 190 used to filter out nongaseous or non-supercritical portions of the thermal fluid 103.

More specifically, the centrifuge 190 includes a housing 176 defining an inlet 166, a gas/supercritical fluid outlet 178, and a liquid outlet 182; a basket 172 positioned within the housing 176; a shaft 170 coupled to the basket 172; and a motor 168 drivingly coupled to shaft 170. The thermal fluid 103 may enter the basket 172 from the thermal bus 102. More particularly, utilizing the motor 168, the shaft 170 rotates the basket 172 containing the thermal fluid 103. The centrifugal force created by rotation of the basket 172 will separate the thermal fluid 103 into a liquid portion of the thermal fluid 103A and a supercritical portion of the thermal fluid 103B (e.g., separate the more dense liquid $CO_2$ that has not yet reached its critical point from the less dense supercritical $CO_2$ or gaseous $CO_2$). Further, the supercritical portion of the thermal fluid 103B will remain collected in the basket 172 wherein it may flow through the gas/supercritical fluid outlet 178, for example, toward the functional components 169 of FIG. 3. Additionally, the liquid portion of the thermal fluid 103A may be collected between the basket 172 and the housing 176 of the centrifuge 190 (flowing through a screen 173 of the basket 172) and through the liquid outlet 182.

It should be appreciated however, that in other exemplary embodiments of the present disclosure, the pump protection device 164 may additionally or alternatively include any other suitable configuration. For example, as in the embodiment of FIG. 3, the pump protection device 164 may be a drain line 180, a filter, or a trap.

However, in other exemplary embodiments, the drain line 180 may configured in any other suitable way. For example, in other exemplary embodiments, the drain line 180 may be configured to be in flow communication directly with the thermal transport bus 102 or positioned ahead of an inlet of the pump. Additionally, in still other exemplary embodiments, the drain line 180 may be in flow communication with the pump protection device 164 and a portion of the thermal transport bus 102 upstream of the plurality of heat source exchangers 106. It should also be appreciated, that in certain exemplary embodiments, drain line 180 may be utilized as the pump protection device 164 configured to filter nongaseous material using the relative height of the components in the thermal management system 100.

Figure 5:
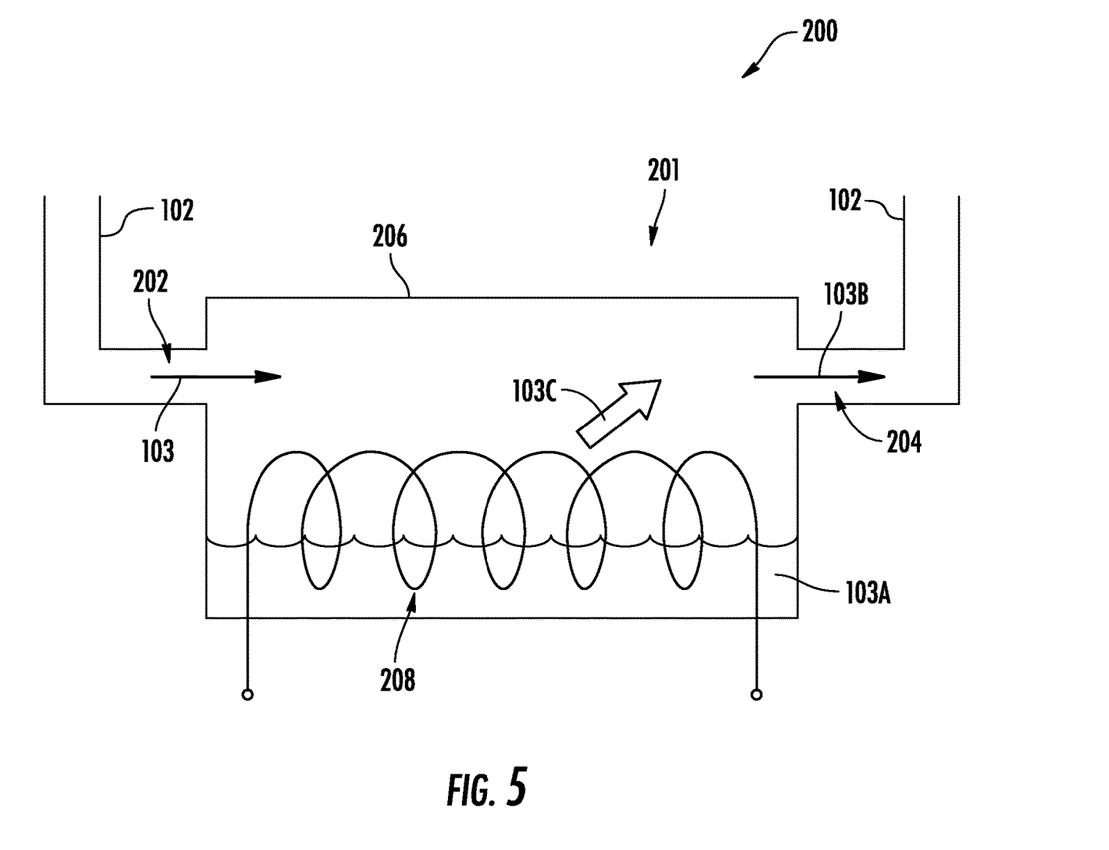
FIG. 5 is a low point trap of a thermal management system in accordance with another exemplary embodiment of the present disclosure.

More particularly, referring now also to FIG. 5, a close-up view of the exemplary low point trap 200 of the thermal management system 100 of FIG. 3 is provided. For the exemplary embodiment depicted, the exemplary low point trap 200 includes a collection basin 201. More particularly, the collection basin 201 defines an inlet 202 and an outlet 204, and includes a casing 206. A thermal fluid 103 may enter the collection basin 201 through the inlet 202. Moreover, a liquid portion of the thermal fluid 103A (or other nongaseous or nonsupercritical portion) may enter the low point trap 200 through the inlet 202 to be collected within the casing 206 of the collection basin 201 within a bottom portion of the casing 206. A supercritical portion of the thermal fluid 103B may proceed through the collection basin 201 through the outlet 204, located within a top portion (or top half) of the casing 206.

Additionally, FIG. 5 provides schematic view of the low point trap 200 of the thermal management system 100 wherein the thermal management system 100 further includes a heat exchange module 208. The collection basin 201 is in thermal communication with the heat exchange module 208. The heat exchange module 208 may be in thermal communication with the thermal fluid 103, or rather the liquid portion of the thermal fluid 103A, or be configured to heat the liquid portion of the thermal fluid 103A collected in the low point trap 200. The liquid portion of the thermal fluid 103A may be heated to reach a temperature and pressure above its critical point further becoming a supercritical fluid. This phase transferred supercritical fluid 103C may then be flowed back in/through the thermal management system 100, joining the supercritical portion of the thermal fluid 103B. For example, liquid $CO_2$ may flow into the low point trap 200 through the inlet 202, be heated to its critical point, and the now supercritical $CO_2$ may flow out of the low point trap 200 through the outlet 204.

Alternatively, in other embodiments the low point trap 200 may be configured to be a float trap or a heat exchanger. It should also be appreciated, that in certain exemplary embodiments, the low point trap 200 may be a heat exchanger subjected to high temperature engine bleeds, fluids, or case conduction.

Figure 6:
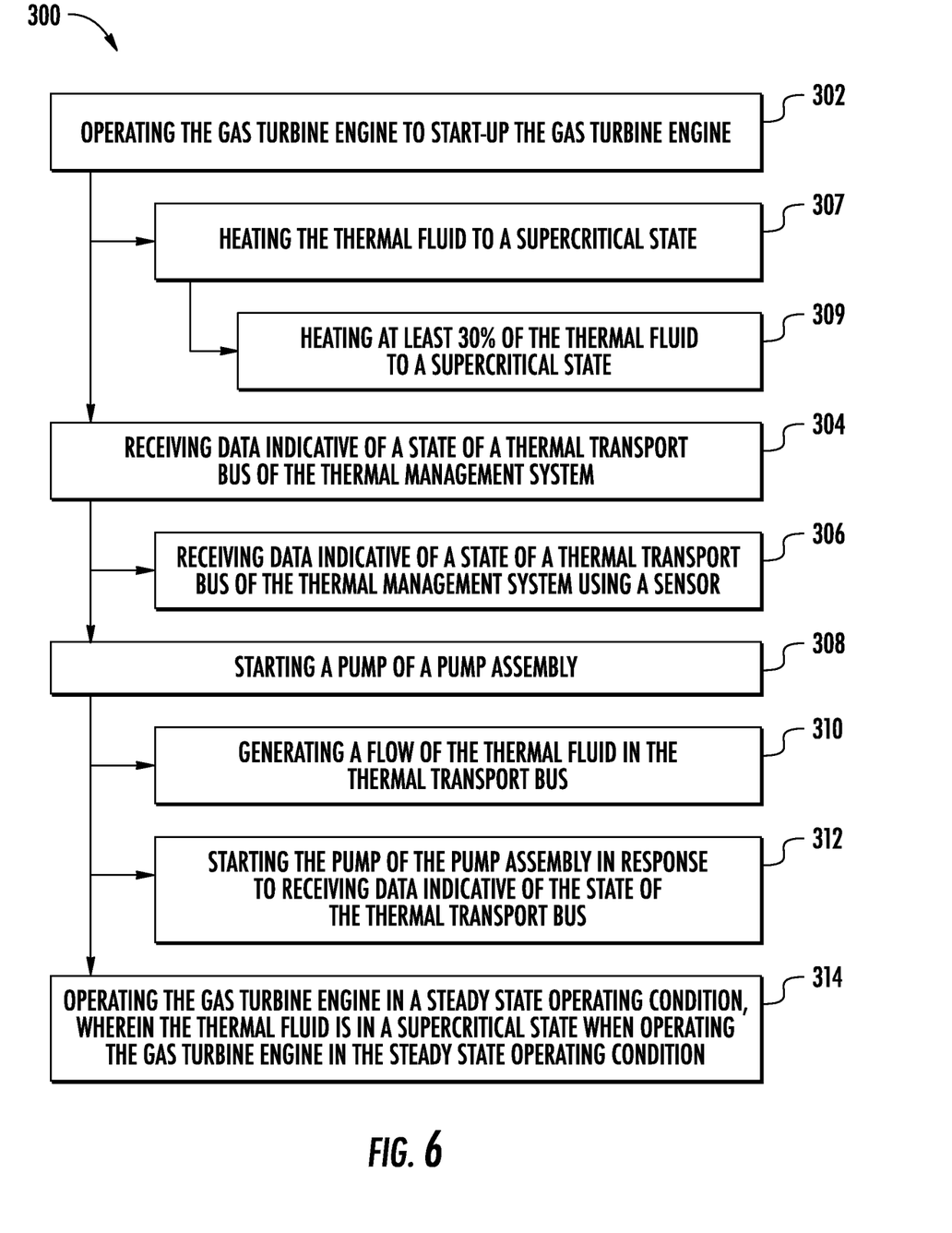
FIG. 6 is a flow diagram of a method for operating a thermal management system of a gas turbine engine in accordance with an exemplary aspect of the present disclosure.

Referring now to FIG. 6, a flow diagram of a method 300 for operating a thermal management system 100 of a gas turbine engine is provided. In at least certain exemplary embodiments, the method 300 may be utilized to operate one or more of the exemplary thermal management systems 100 described above with reference to FIGS. 1 through 5. For example, the thermal management system 100 may generally include a plurality of heat source exchangers 106 (such as a first heat source exchanger and a second heat source exchanger), pump assembly 160, and a thermal transport bus 102 thermally connecting the plurality of heat source exchangers 106 and pump assembly 160. Additionally, the method 300 may be implemented by one or more controllers, such as using an exemplary computing system 400 depicted in FIG. 7 and described below.

The method 300 generally includes at (302) operating the gas turbine engine to start-up the gas turbine engine. Operating the gas turbine engine to start-up the gas turbine engine at (302) may include accelerating the gas turbine engine with a starter, such as a starter motor/generator or a pneumatic starter; initiating a fuel flow to a combustion section of the gas turbine engine once a rotational speed of the gas turbine engine reaches a lightoff speed; and accelerating the gas turbine engine from the lightoff speed to an idle speed.

More specifically, for the exemplary aspect depicted, operating the gas turbine engine to start-up the gas turbine engine at (302) includes at (307) heating the thermal fluid 103 to a supercritical state. More specifically, still, in the exemplary aspect depicted, heating the thermal fluid 103 to the supercritical state at (307) includes at (309) heating at least 30% by mass of the thermal fluid 103 to the supercritical state. For example, heating the thermal fluid 103 to the supercritical state at (307) may further include heating at least 40% by mass of the thermal fluid 103 to the supercritical state, such as at least 50%, such as at least 60%, such as up to 100%, such as up to 90%.

Further, the thermal fluid 103 for the exemplary aspect depicted may be a $CO_2$.

It will be appreciated that heating the thermal fluid to the supercritical state at (307) may further include transferring heat from one or more accessory systems of the gas turbine engine to one or more of the plurality of heat source exchangers of the thermal management system, transferring heat from one or more flows through the gas turbine engine (e.g., exhaust gas airflow, compressor bleed airflow, etc.) to one or more of the plurality of heat source exchangers of the thermal management system, or both. In such a manner, as the gas turbine engine begins to operate at higher speeds and higher temperatures, more heat may be added to the thermal fluid to facilitate a phase change of the thermal fluid to the supercritical state.

The method 300 additionally includes at (304) receiving data indicative of a state of a thermal transport bus 102 of the thermal management system 100, and more particularly for the exemplary aspect depicted, receiving data indicative of the state of the thermal transport bus 102 at (304) includes at (306) receiving data indicative of the state of the thermal transport bus using a sensor, such as sensor 412. For the exemplary aspect of FIG. 6, the state of the thermal transport bus 102 includes a phase of a thermal fluid within the thermal transport bus 102. For example, the data indicative of the state of the thermal transport bus 102 sensed may include data indicative of the thermal fluid having been heated at (307) or (309), or to any other state described herein. In such a manner, data indicative of the state of the thermal transport bus received at (304) may include data indicative of the thermal fluid being substantially completely in a supercritical phase, data indicative of the thermal fluid being partially in a supercritical phase (e.g., approximately 50% by weight), data indicative of the thermal fluid being substantially completely in a liquid or gaseous phase, etc.

The sensor, such as sensor 412 of the thermal management system 100, for the exemplary aspect depicted, is at least one a pressure sensor, temperature sensor, turbidity sensor, flow rate sensor, or combinations thereof.

Referring still to FIG. 6, the method 300 includes at (308) starting a pump 162 of the pump assembly 160. For the exemplary aspect depicted, starting the pump 162 of the pump assembly 160 at (308) includes at (310) generating a flow of the thermal fluid 103 in the thermal transport bus 102. Moreover, it will be appreciated that for the exemplary aspect depicted, starting the pump 162 of the pump assembly 160 at (308) includes at (312) starting the pump 162 of the pump assembly 160 in response to receiving data indicative of the state of the thermal transport bus 102 at (304), such as in response to receiving data indicative the thermal fluid having been heated at (307) or (309), or to any other state described herein. In such a manner, starting the pump 162 at (308) may include starting the pump 162 once all or substantially all of the thermal fluid through the pump 162 is in a non-liquid state, or supercritical state.

It will be appreciated that the data received at (304) may not be directly sensed data of a phase of the thermal fluid. For example, although not depicted, the method 300 may include one or more intervening steps of determining a phase of the thermal fluid based on the data received at (304), including, e.g., executing a calculation, a comparison, or a model to determine the data indicative of the phase of the thermal fluid. With such an exemplary aspect, starting the pump 162 of the pump assembly 160 in response to receiving data indicative of the state of the thermal transport bus 102 at (312) may include starting the pump 162 of the pump assembly 160 in response to receiving data indicative of the state of the thermal transport bus 102 and determining the data indicative of the phase of the thermal fluid through the one or more intervening steps of (using, e.g., a calculation, a comparison, or a model).

Further, the method 300 includes at (314) operating the gas turbine engine in a steady state operating condition. The thermal fluid is in the supercritical state when operating the gas turbine engine in steady state operating condition. The steady state operating condition may be a flight operating condition, such as cruise. Or the steady state operating condition may be a ground operating condition, such as idle or taxi.

It will be appreciated that operating a thermal management system 100 and a gas turbine engine in accordance with one or more of the exemplary aspects described herein with reference to FIG. 6 may reduce undesirable and premature wear on a pump of a pump assembly of the thermal management system 100 by reducing a likelihood of the thermal fluid being in multiple phases (and therefore having different densities) when passing through the pump, which can create imbalances and the like.

Moreover, it will be appreciated that operating a thermal management system 100 and a gas turbine engine in accordance with one or more of the exemplary aspects described herein with reference to FIG. 6 may result in an overall more efficient gas turbine engine. Specifically, operating a thermal management system 100 in accordance with one or more these exemplary aspects may conserve heat and utilize such conserved heat to increase an efficiency of the gas turbine engine.

It will be appreciated that the thermal management system 100 may further include a computing device or controller operable with certain aspects of the thermal management system 100 for controlling various aspects of the thermal management system 100. The computing device may be part of the computing system. In such a manner, it will be appreciated that the thermal management system may further include a sensor for sensing data indicative of the thermal management system 100, and, e.g., the pump assembly 160. For example, the sensor 412 may be configured to sense data indicative of a phase of the thermal fluid through the thermal management system 100, and, e.g., the pump assembly 160.

Figure 7:
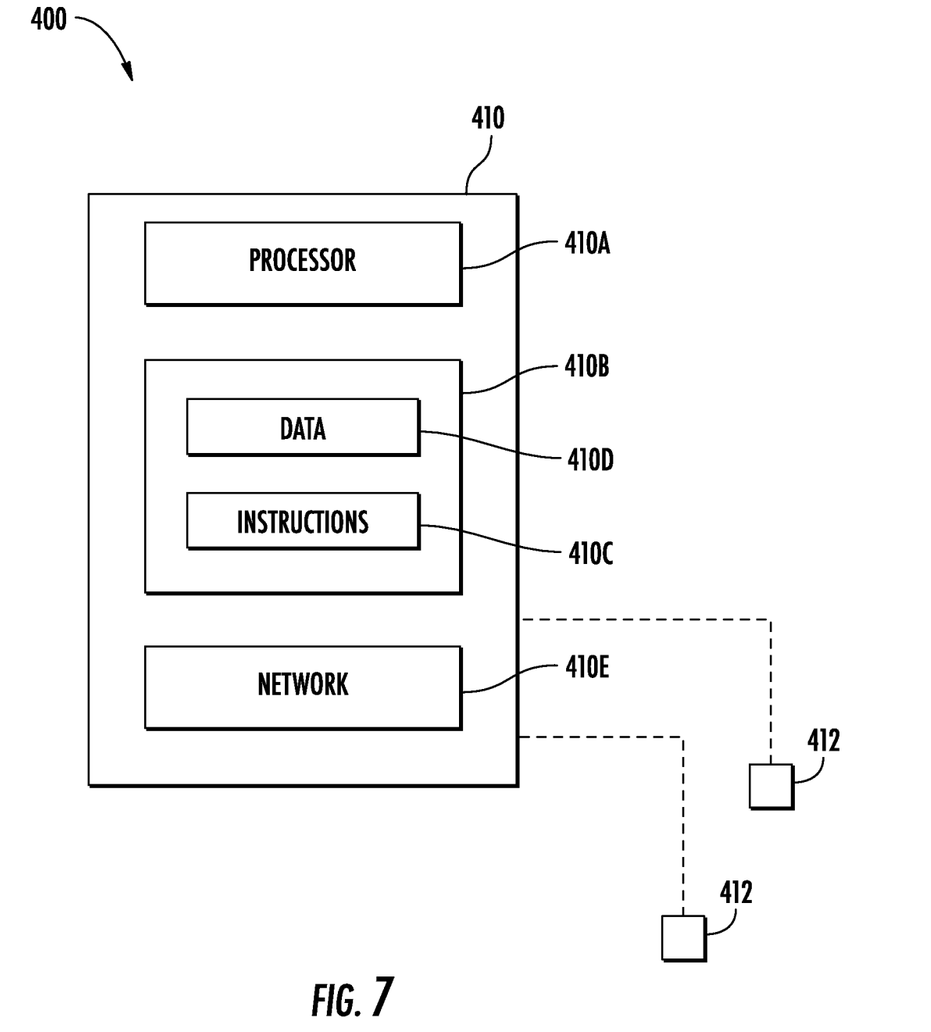
FIG. 7 is a block diagram of one embodiment of an exemplary controller that may be used within the thermal management system of FIG. 3.

Referring now to FIG. 7, the example computing system 400 for operable use with certain aspects of the thermal management system 100, as referred to with respect to FIG. 6 is provided. The computing system 400 can be used, for example, as a controller of a thermal management system 100. The computing system 400 can include one or more computing device(s) 410. The computing device(s) 410 can include one or more processor(s) 410A and one or more memory device(s) 410B. The one or more processor(s) 410A can include any suitable processing device, such as a microprocessor, microcontroller, integrated circuit, logic device, or other suitable processing device. The one or more memory device(s) 410B can include one or more computer-readable media, including, but not limited to, non-transitory computer-readable media, RAM, ROM, hard drives, flash drives, or other memory devices.

The one or more memory device(s) 410B can store information accessible by the one or more processor(s) 410A, including computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor(s) 410A to perform operations, such as any of the operations and functions for which the computing system 400 or the computing device(s) 310 are configured, the operations for operating a thermal management system 100 (e.g., method 300), as described herein, or any other operations or functions of the one or more computing device(s) 410. The instructions 410C can be software written in any suitable programming language or can be implemented in hardware. Additionally, or alternatively, the instructions 410C can be executed in logically or virtually separate threads on processor(s) 410A. The memory device(s) 410B can further store data 410D that can be accessed by the processor(s) 410A. For example, the data 410D can include data indicative of power flows, data indicative of engine/aircraft operating conditions, or any other data or information described herein.

The computing device(s) 410 can also include a network interface 410E used to communicate, for example, with the other components of a thermal management system, gas turbine engine, etc. (e.g., via a network), such as one or more sensors 412. The network interface 410E can include any suitable components for interfacing with one or more network(s), including for example, transmitters, receivers, ports, controllers, antennas, or other suitable components. One or more external display devices (not depicted) can be configured to receive one or more commands from the computing device(s) 410.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A thermal management system for incorporation into a gas turbine engine, the thermal management system comprising: a thermal transport bus having a thermal fluid flowing therethrough; a plurality of heat source exchangers in thermal communication with the thermal fluid in the thermal transport bus; and a pump assembly in flow communication with the thermal transport bus, the pump assembly comprising: a pump positioned at a first height; and a pump protection device positioned at a second height, wherein the second height is lower than the first height along a vertical direction, wherein the gas turbine engine, an aircraft, or both define the vertical direction.

The thermal management system of one or more of these clauses, wherein the pump is configured to generate a flow of the thermal fluid in the thermal transport bus.

The thermal management system of one or more of these clauses, wherein the pump is the highest component in the vertical direction of the pump assembly.

The thermal management system of one or more of these clauses, wherein the pump protection device is configured to filter out nongaseous material.

The thermal management system of one or more of these clauses, wherein the pump protection device is at least one of a filter, a centrifuge, or a trap.

The thermal management system of one or more of these clauses, wherein the pump protection device comprises a low point trap configured to collect nongaseous material.

The thermal management system of one or more of these clauses, wherein the thermal management system comprises a heat exchange module, wherein the low point trap is operable with the heat exchange module.

The thermal management system of one or more of these clauses, wherein the low point trap is at least one of a collection basin, a float trap, or a heat exchanger.

The thermal management system of one or more of these clauses, wherein the heat exchange module is in thermal communication with the thermal fluid in the thermal transport bus at a location downstream of the plurality of heat source exchangers for transferring heat from the thermal fluid to a surface of one or more components of the gas turbine engine or the aircraft.

The thermal management system of one or more of these clauses, wherein the pump assembly comprises a drain line, wherein the drain line is in flow communication with the pump protection device with the low point trap.

The thermal management system of one or more of these clauses, wherein the pump defines an inlet, and wherein the drain line is upstream of the inlet of the pump.

The thermal management system of one or more of these clauses, wherein at least some of the thermal fluid is a supercritical CO2.

A gas turbine engine comprising: a compressor section rotatable with a turbine section; a main lubrication system for providing lubrication to one or more components located at least one of the compressor section or the turbine section; a thermal management system comprising: a thermal transport bus having a thermal fluid flowing therethrough; a plurality of heat source exchangers in thermal communication with the thermal fluid in the thermal transport bus; and a pump assembly in flow communication with the thermal transport bus, the pump assembly comprising: a pump positioned at a first height; and a pump protection device positioned at a second height, wherein the second height is lower than the first height along a vertical direction, wherein the gas turbine engine, an aircraft, or both define the vertical direction.

The gas turbine engine of one or more of these clauses, wherein the pump generates a flow of the thermal fluid in the thermal transport bus.

The gas turbine engine of one or more of these clauses, wherein the pump is the highest component in the vertical direction of the pump assembly.

The gas turbine engine of one or more of these clauses, wherein the pump protection device is operable for filtering out nongaseous material.

The gas turbine engine of one or more of these clauses, wherein the pump protection device is at least one of a filter, a centrifuge, or a trap.

The gas turbine engine of one or more of these clauses, wherein the pump protection device comprises a low point trap operable of collecting nongaseous material.

The gas turbine engine of one or more of these clauses, wherein a thermal management system comprises a heat exchange module, wherein the low point trap is operable with the heat exchange module.

The gas turbine engine of one or more of these clauses, wherein the surface heat exchange module is in thermal communication with the thermal fluid in the thermal transport bus at a location downstream of the plurality of heat source exchangers for transferring heat from the thermal fluid to a surface of one or more components of the gas turbine engine or the aircraft.

What is claimed:

1. A thermal management system for incorporation into a gas turbine engine, the thermal management system comprising:
   a thermal transport bus having a thermal fluid flowing therethrough;
   a plurality of heat source exchangers in thermal communication with the thermal fluid in the thermal transport bus; and
   a pump assembly in flow communication with the thermal transport bus, the pump assembly comprising:
     a pump positioned at a first height; and
     a pump protection device positioned at a second height, wherein the second height is lower than the first height along a vertical direction during a normal engine attitude, wherein the gas turbine engine, an aircraft, or both define the vertical direction.

2. The thermal management system of claim 1, wherein the pump is configured to generate a flow of the thermal fluid in the thermal transport bus.

3. The thermal management system of claim 1, wherein the pump is the highest component in the vertical direction of the pump assembly.

4. The thermal management system of claim 1, wherein the pump protection device is configured to filter out non-gaseous material.

5. The thermal management system of claim 4, wherein the pump protection device is at least one of a filter, a centrifuge, or a trap.

6. The thermal management system of claim 1, wherein the pump protection device comprises a low point trap configured to collect nongaseous material.

7. The thermal management system of claim 6, wherein the thermal management system comprises a heat exchange module, wherein the low point trap is operable with the heat exchange module.

8. The thermal management system of claim 6, wherein the low point trap is at least one of a collection basin, a float trap, or a heat exchanger.

9. The thermal management system of claim 8, wherein the heat exchange module is in thermal communication with the thermal fluid in the thermal transport bus at a location downstream of the plurality of heat source exchangers for transferring heat from the thermal fluid to a surface of one or more components of the gas turbine engine or the aircraft.

10. The thermal management system of claim 6, wherein the pump assembly comprises a drain line, wherein the drain line is in flow communication with the pump protection device with the low point trap.

11. The thermal management system of claim 10, wherein the pump defines an inlet, and wherein the drain line is upstream of the inlet of the pump.

12. The thermal management system of claim 1, wherein at least some of the thermal fluid is a supercritical CO2.

13. A gas turbine engine comprising:
   a compressor section rotatable with a turbine section;
   a main lubrication system for providing lubrication to one or more components located in at least one of the compressor section or the turbine section;
   a thermal management system comprising:
     a thermal transport bus having a thermal fluid flowing therethrough;
     a plurality of heat source exchangers in thermal communication with the thermal fluid in the thermal transport bus; and
     a pump assembly in flow communication with the thermal transport bus, the pump assembly comprising:
       a pump positioned at a first height; and
       a pump protection device positioned at a second height, wherein
   the second height is lower than the first height along a vertical direction during a normal engine attitude, wherein the gas turbine engine, an aircraft, or both define the vertical direction.

14. The gas turbine engine of claim 13, wherein the pump generates a flow of the thermal fluid in the thermal transport bus.

15. The gas turbine engine of claim 13, wherein the pump is the highest component in the vertical direction of the pump assembly.

16. The gas turbine engine of claim 13, wherein the pump protection device is operable for filtering out nongaseous material.

17. The gas turbine engine of claim 16, wherein the pump protection device is at least one of a filter, a centrifuge, or a trap.

18. The gas turbine engine of claim 13, wherein the pump protection device comprises a low point trap operable of collecting nongaseous material.

19. The gas turbine engine of claim 18, wherein the thermal management system comprises a heat exchange module, wherein the low point trap is operable with the heat exchange module.

20. The gas turbine engine of claim 19, wherein the surface heat exchange module is in thermal communication with the thermal fluid in the thermal transport bus at a location downstream of the plurality of heat source exchangers for transferring heat from the thermal fluid to a surface of one or more components of the gas turbine engine or the aircraft.

* * * * *